United States Patent
Wu (10) Patent No.: US 10,631,236 B2
(45) Date of Patent: Apr. 21, 2020

(54) METHOD OF HANDLING MEASUREMENT AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/057,812

(22) Filed: Aug. 7, 2018

(65) Prior Publication Data
US 2019/0053138 A1 Feb. 14, 2019

Related U.S. Application Data

(60) Provisional application No. 62/542,789, filed on Aug. 8, 2017.

(51) Int. Cl.
| | |
|---|---|
| *H04W 48/16* | (2009.01) |
| *H04W 36/00* | (2009.01) |
| *H04W 24/10* | (2009.01) |
| *H04W 76/27* | (2018.01) |
| *H04W 48/02* | (2009.01) |

(52) U.S. Cl.
CPC ........... *H04W 48/16* (2013.01); *H04W 24/10* (2013.01); *H04W 36/0069* (2018.08); *H04W 76/27* (2018.02); *H04W 36/0088* (2013.01); *H04W 48/02* (2013.01)

(58) Field of Classification Search
CPC ...... H04W 48/16; H04W 76/27; H04W 24/10
See application file for complete search history.

(56) References Cited

U.S. PATENT DOCUMENTS

2015/0181473 A1* 6/2015 Horn ................. H04W 36/0027
370/331
2019/0166576 A1* 5/2019 Kim ..................... H04W 52/02

OTHER PUBLICATIONS

Nokia, "ANR for various gNB activation scenarios", 3GPP TSG-RAN WG3 NR adhoc #2 Qingdao, P.R. China, Jun. 27-29, 2017; R3-172037 (Year: 2017).*
3GPP TS 37.340 V0.2.0 (Jun. 2017).
Search Report dated Dec. 7, 2018 for EP application No. 18187980.0, pp. 1-6.

(Continued)

*Primary Examiner* — Siming Liu
(74) *Attorney, Agent, or Firm* — Winston Hsu (57) ABSTRACT

A first base station (BS) receives at least one user equipment (UE) capability of the communication device, receives an access restriction configuration for the communication device. The first BS configures the communication device to measure a second radio access technology (RAT), when the at least one UE capability indicates that the communication device supports a dual connectivity (DC) of a first RAT and the second RAT and the access restriction configuration indicates that the communication device is allowed to use the second RAT; and not configures the communication device to measure the second RAT, when the at least one UE capability indicates that the communication device does not support the DC, or when the access restriction configuration indicates that the communication device is not allowed to use the second RAT.

10 Claims, 5 Drawing Sheets

(56) References Cited

OTHER PUBLICATIONS

3GPP TS 36.331 V14.3.0 (Jun. 2017), "3rd Generation Partnership Project; Technical Specification Group Radio Access Network; Evolved Universal Terrestrial Radio Access (E-UTRA); Radio Resource Control (RRC); Protocol specification (Release 14)", XP051336663, pp. 1-745.

3GPP TS 36.423 V14.3.0 (Jun. 2017), "3rd Generation Partnership Project; Technical Specification Group Radio Access Network; Evolved Universal Terrestrial Radio Access Network (E-UTRAN); X2 application protocol (X2AP) (Release 14)", XP051299045, pp. 1-242.

Nokia, Alcatel-Lucent Shanghai Bell, "ANR for various gNB activation scenarios", 3GPP TSG-RAN WG3 NR Adhoc #2, R3-172037, Jun. 27-29, 2017, Qingdao, P.R. China, XP051301988, pp. 1-2.

\* cited by examiner

METHOD OF HANDLING MEASUREMENT AND RELATED COMMUNICATION DEVICE

CROSS REFERENCE TO RELATED APPLICATIONS

This application claims the benefit of U.S. Provisional Application No. 62/542,789 filed on Aug. 8, 2017, which is incorporated herein by reference.

BACKGROUND OF THE INVENTION

1. Field of the Invention

The present invention relates to a communication device and a method used in a wireless communication system, and more particularly, to a communication device and a method of handling a measurement.

2. Description of the Prior Art

A base station (BS) may configure a user equipment (UE) to measure a radio access technology (RAT), while communicating with the UE. However, the BS may not know how (when) to configure the UE to measure the RAT. Thus, the UE may unnecessarily measures the RAT and power consumption of the UE may be increased.

SUMMARY OF THE INVENTION

The present invention therefore provides a method and related communication device for handling a measurement to solve the abovementioned problem.

The method includes: A first base station (BS) connecting to a communication device via a cell belonging to the first BS, and configuring a signaling radio bearer (SRB) to the communication device via the cell; receiving at least one user equipment (UE) capability of the communication device; receiving an access restriction configuration for the communication device; configuring the communication device to measure a second radio access technology (RAT), when the at least one UE capability indicates that the communication device supports a dual connectivity (DC) of a first RAT and the second RAT and the access restriction configuration indicates that the communication device is allowed to use the second RAT; and not configuring the communication device to measure the second RAT, when the at least one UE capability indicates that the communication device does not support the DC, or when the access restriction configuration indicates that the communication device is not allowed to use the second RAT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
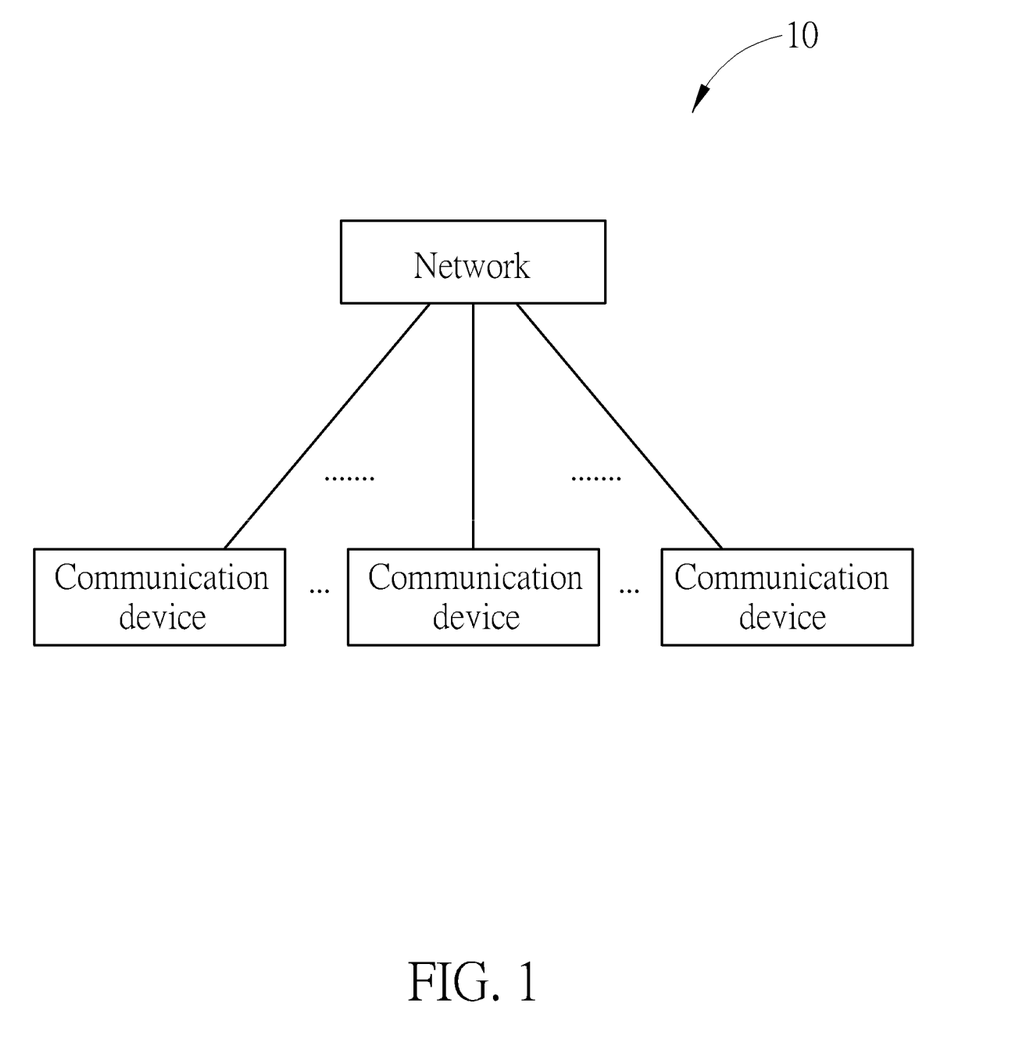
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or multiple cells including a primary cell (PCell), zero, one or more secondary cells (SCells) and zero or one primary SCell (PSCell). The abovementioned cells may be operated according to the same radio access technology (RAT) or different RATs. The RATs may be evolved universal terrestrial radio access network (E-UTRAN), fifth generation (5G) (or called New Radio or NR) or sixth generation (6G).

Practically, the network in FIG. 1 may include an E-UTRAN including at least one evolved Node-B (eNB). The network may include a new radio (NR)/next generation (NextGen) network including at least one 5G base station (BS) (or called gNB), an evolved gNB (egNB) or a 6G BS. In general, a BS may also be used to refer any of the eNB, the gNB, the egNB and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink, the communication device is the transmitter and the network is the receiver, and for a downlink, the network is the transmitter and the communication device is the receiver.

Figure 2:
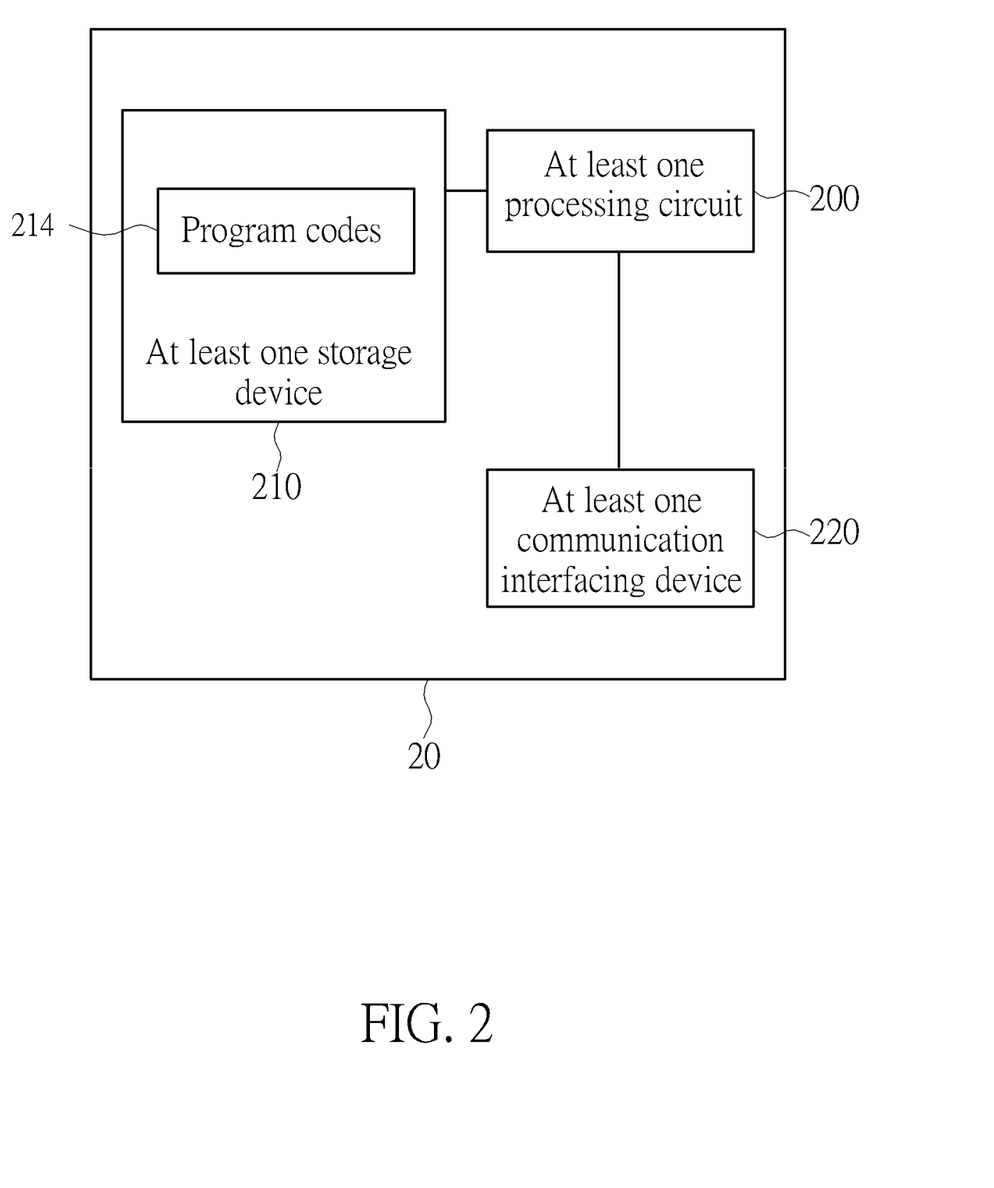
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
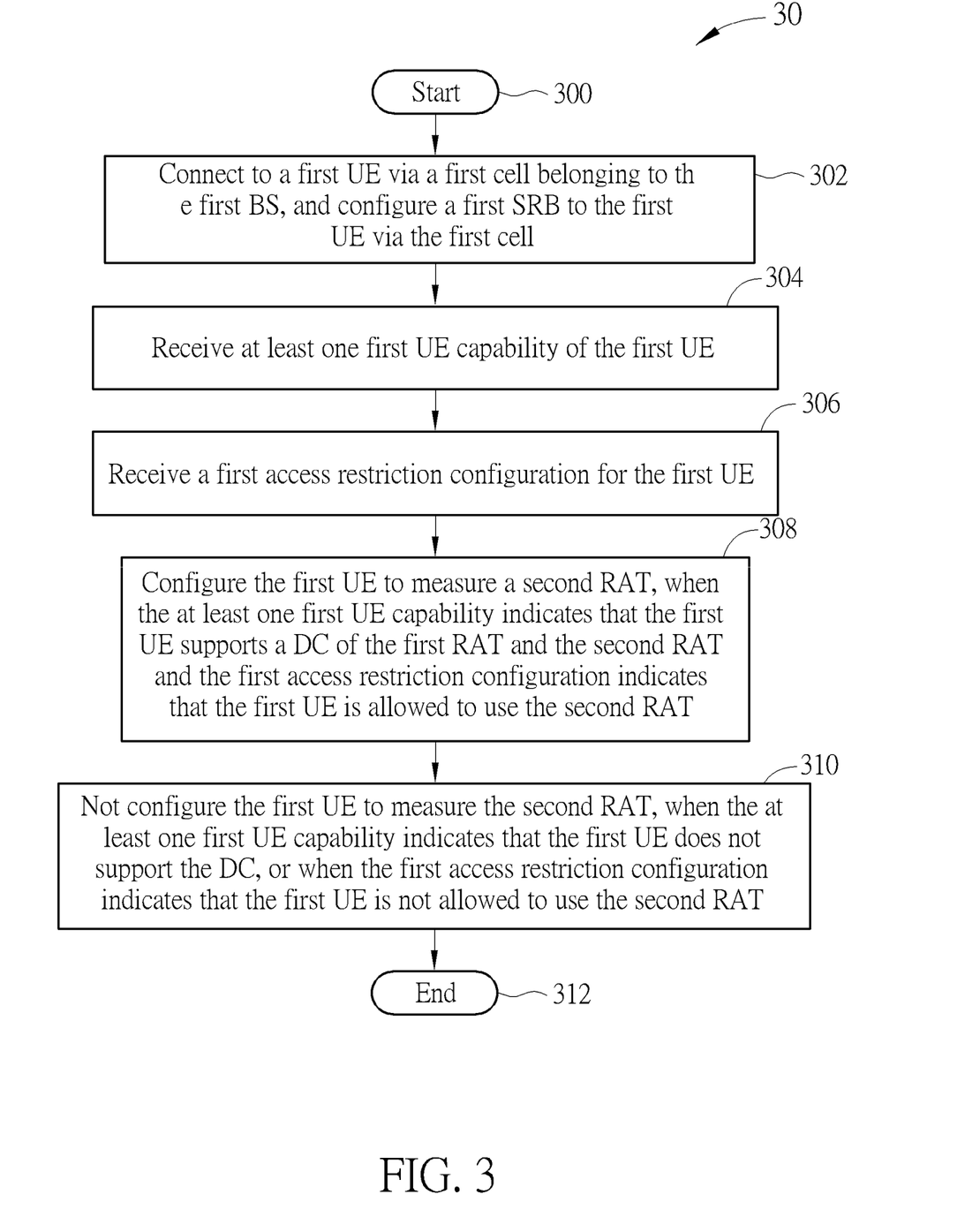
FIG. 3 is a flowchart of a process according to an example of the present invention.

A process 30 in FIG. 3 may be utilized in a first BS of a first RAT in a network (e.g., the network in FIG. 1), and includes the following steps:

Step 300: Start.

Step 302: Connect to a first UE via a first cell belonging to the first BS, and configure a first signaling radio bearer (SRB) to the first UE via the first cell.

Step 304: Receive at least one first UE capability of the first UE.

Step 306: Receive a first access restriction configuration for the first UE.

Step 308: Configure the first UE to measure a second RAT, when the at least one first UE capability indicates that the first UE supports a DC of the first RAT and the second RAT and the first access restriction configuration indicates that the first UE is allowed to use the second RAT.

Step 310: Not configure the first UE to measure the second RAT, when the at least one first UE capability indicates that the first UE does not support the DC, or when the first access restriction configuration indicates that the first UE is not allowed to use the second RAT.

Step 312: End.

Figure 4:
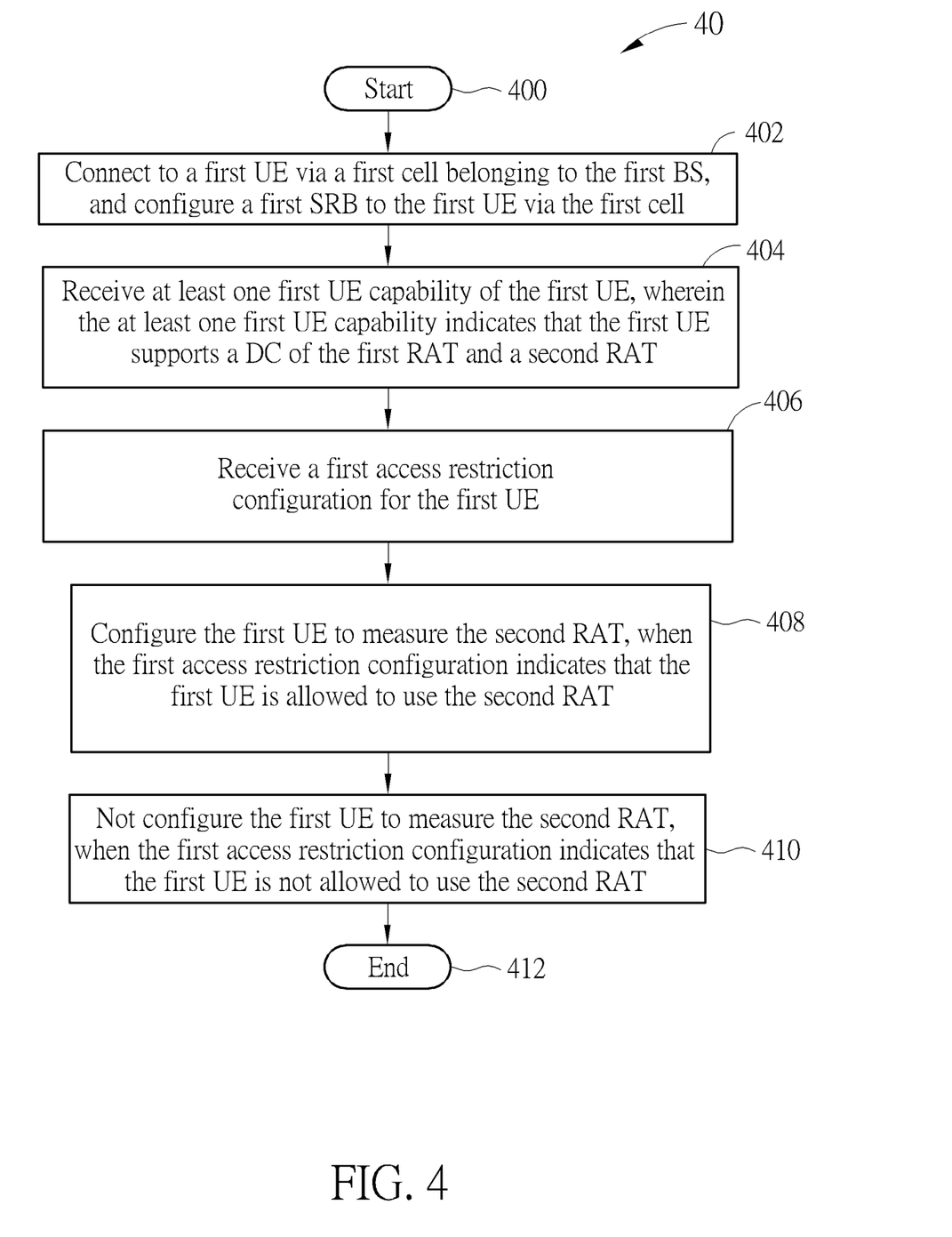
FIG. 4 is a flowchart of a process according to an example of the present invention.

A process 40 in FIG. 4 may be utilized in a first BS of a first RAT in a network (e.g., the network in FIG. 1), and includes the following steps:

Step 400: Start.

Step 402: Connect to a first UE via a first cell belonging to the first BS, and configure a first SRB to the first UE via the first cell.

Step 404: Receive at least one first UE capability of the first UE, wherein the at least one first UE capability indicates that the first UE supports a DC of the first RAT and a second RAT.

Step 406: Receive a first access restriction configuration for the first UE.

Step 408: Configure the first UE to measure the second RAT, when the first access restriction configuration indicates that the first UE is allowed to use the second RAT.

Step 410: Not configure the first UE to measure the second RAT, when the first access restriction configuration indicates that the first UE is not allowed to use the second RAT.

Step 412: End.

Figure 5:
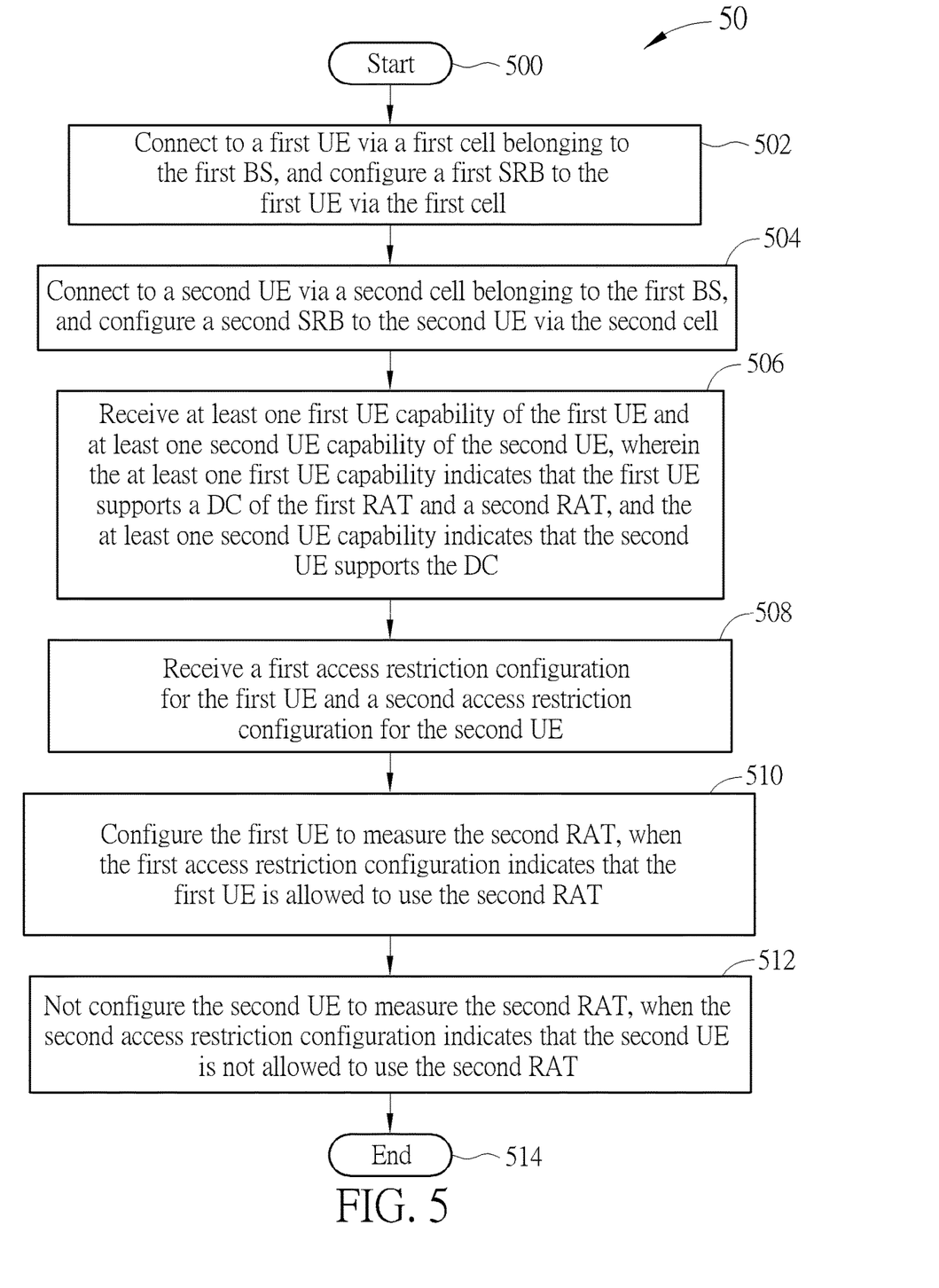
FIG. 5 is a flowchart of a process according to an example of the present invention.

A process 50 in FIG. 5 may be utilized in a first BS of a first RAT in a network (e.g., the network in FIG. 1), and includes the following steps:

Step 500: Start.

Step 502: Connect to a first UE via a first cell belonging to the first BS, and configure a first SRB to the first UE via the first cell.

Step 504: Connect to a second UE via a second cell belonging to the first BS, and configure a second SRB to the second UE via the second cell.

Step 506: Receive at least one first UE capability of the first UE and at least one second UE capability of the second UE, wherein the at least one first UE capability indicates that the first UE supports a DC of the first RAT and a second RAT, and the at least one second UE capability indicates that the second UE supports the DC.

Step 508: Receive a first access restriction configuration for the first UE and a second access restriction configuration for the second UE.

Step 510: Configure the first UE to measure the second RAT, when the first access restriction configuration indicates that the first UE is allowed to use the second RAT.

Step 512: Not configure the second UE to measure the second RAT, when the second access restriction configuration indicates that the second UE is not allowed to use the second RAT.

Step 514: End.

In the following description and examples, simplification of the terms is utilized. "the UE" is used for representing "the first UE and/or the second UE". "the SRB" is used for representing "the first SRB and/or the second SRB". "the at least one UE capability" is used for representing "the at least one first UE capability and/or the at least one second UE capability". "the access restriction configuration" is used for representing "the first access restriction configuration and/or the second access restriction configuration". "the DC" is used for representing "the DC of the first RAT and the second RAT".

According to the above processes, the first BS avoids to (e.g., does not) unnecessarily configure the UE to measure the second RAT, when the UE supports the DC but the UE is not allowed to use the second RAT. The UE may not be allowed to use the second RAT (or may not be allowed to use the DC), because the UE does not subscribe the second RAT. Without applying the present invention, the first BS may configure the UE to measure the second RAT, when the UE supports the DC but the UE is not allowed to use the second RAT. Thus, the UE wastes power to measure the second RAT.

The following examples may be applied to the processes 30-50.

The first BS may transmit a first radio resource control (RRC) message for configuring the first UE to measure the second RAT, to the first UE. The first UE may transmit a first RRC response message to the first BS on the SRB, e.g., via the first cell or the second cell of the first BS of the first RAT, to respond the first RRC message.

According to the above processes, the first BS configures (e.g., determines to configure) the first UE to measure the second RAT not only under a first condition that the at least one first UE capability indicates that the UE supports the DC, but also under a second condition that the first UE is allowed to use the second RAT (e.g., for the DC). Besides the first condition and the second condition, the first BS may or may not consider other condition(s) to configure the first UE to measure the second RAT.

In one example, the at least one first UE capability indicates a first frequency band(s) of the first RAT, and indicates a second frequency band(s) of the second RAT supported by the first UE in the DC.

In one example, the UE supports the DC, but the first BS may only support the DC with a second BS (e.g., of the second RAT in the network) using a frequency band of the second RAT which is not one of the second frequency band(s) of the second RAT supported by the UE in the DC. In this case, the first BS determines that the UE does not support the DC.

In one example, the at least one first UE capability indicates that the first UE supports a handover to the second RAT. The at least one first UE capability may indicate the second frequency band(s) of the second RAT supported by the first UE for the handover. In one example, the at least one first UE capability indicates that the first UE does not support the handover. In one example, the at least one second UE capability indicates that the second UE supports the handover. The at least one second UE capability may indicate the second frequency band(s) of the second RAT supported by the second UE for the handover. In one example, the at least one second UE capability indicates that the second UE does not support the handover.

The first BS may receive the access restriction configuration from a core network (CN) (e.g., Evolved Packet Core (e.g., a Mobility Management Entity) or a 5G Core (e.g., an Access and Mobility Management Function)). In one example, the CN may determine the first UE is allowed to use the second RAT or not by taking into account whether the UE supports the DC. If the UE does not support the DC or the second RAT, the CN may indicate that the first UE is not allowed to use the second RAT.

In one example, the first RRC message includes a first measurement configuration configuring the first UE to measure the second RAT. The first measurement configuration may configure a first carrier frequency of the second RAT to the first UE. The first UE may measure the first carrier frequency according to the first measurement configuration. For example, the first measurement configuration includes an absolute radio-frequency channel number (ARFCN) identifying the first carrier frequency. The first measurement configuration may include a measurement identity and a reporting configuration. Thus, the first UE may transmit first measurement report(s) including first measurement result(s) measured on the first carrier frequency according to the reporting configuration. The first UE may measure at least one of a primary synchronization signal (PSS), a secondary synchronization signal (SSS) and a physical broadcast channel (PBCH) in SS block(s) on the first carrier frequency, to generate the first measurement result(s). The first UE may measure channel state information reference signal(s) (CSI-RS(s)) on the first carrier frequency, to generate the first measurement result(s). The first BS may perform a secondary node (SN) Addition procedure to configure a third BS of the second RAT as a SN for the UE according to the first measurement result(s). In one example, the first BS may configure the first measurement configuration for configuring the DC to the first UE.

The first BS may configure the first UE to measure the second RAT for at least one of an Automatic Neighbor Relation (ANR) and a Self-Organizing Networks (SON) Operation, when the first access restriction configuration indicates that the first UE is allowed to use the second RAT and/or the at least one first UE capability indicates that the first UE supports the DC or supports the handover to the second RAT.

In one example, the first BS configures the second UE to measure the second RAT for at least one of the ANR and the SON Operation and (e.g., but) not for configuring the DC, when the second UE supports the DC or supports the handover to the second RAT, and (e.g., but) is not allowed to use the second RAT (as indicated in the access restriction configuration).

The first BS may transmit a second RRC message to the UE on the SRB. The second RRC message configures a second measurement configuration for the at least one of the ANR and the SON Operation and (e.g., but) not for configuring the DC. The second measurement configuration may configure a second carrier frequency of the second RAT to the UE. The UE measures the second carrier frequency of the second RAT according to the second measurement configuration. For example, the second measurement configuration includes an ARFCN identifying the second carrier frequency. The second measurement configuration may include a measurement identity and a report configuration. Thus, the UE may transmit second measurement report(s) including second measurement result(s) measured on the second carrier frequency according to the reporting configuration. The UE may measure at least one of a PSS, a SSS and a PBCH in SS block(s) on the second carrier frequency, to generate the second measurement result(s). The UE may measure CSI-RS(s) on the second carrier frequency, to generate the second measurement result(s). The first BS may perform function(s) (or application(s)) for the at least one of the ANR and the SON Operation according to the second measurement result(s). To respond the second RRC message, the UE may transmit a second RRC response message to the first BS on the SRB, e.g., via the first cell or the second cell of the first BS of the first RAT.

In one example, the first BS does not configure the UE to measure the second RAT for any purpose, when the UE does not support the DC (as indicated in the at least one UE capability), or when the access restriction configuration does not allow the UE to use the second RAT.

In one example, the first RAT includes a long term evolution (LTE) (e.g., E-UTRAN), and the second RAT includes a NR (e.g., 5G). In one example, the first RAT includes the NR and the second RAT includes the LTE. The first cell and the second cell may be the same or different.

In one example, the first BS receives the at least one first or second UE capability from the first or second UE, a fourth BS of the first RAT or a core network (CN). In one example, the first BS receives the at least one first or second UE capability from the first or second UE on the first SRB. In one example, the first BS receives the at least one first or second UE capability from the fourth BS in an X2 application protocol (X2AP) message or in an Xn application protocol (XnAP) message. The X2AP message or the Xn AP message may be a Handover Request message or a RETRIEVE UE CONTEXT RESPONSE message. In one example, the first BS receives the at least one first or second UE capability from the core network in an S1 Application Protocol (S1AP) message or in a NG Application Protocol (NGAP) message. For example, the S1AP message or the NGAP message may be a Handover Request message, an INITIAL CONTEXT SETUP REQUEST message or a Downlink NAS Transport message.

In one example, the first BS receives the first access restriction configuration for the first UE from the fourth BS or the core network, and receives the second access restriction configuration for the second UE from the fourth BS or the core network. In one example, the first BS receives the first access restriction configuration from the fourth BS in the X2AP message or in the XnAP message. The X2AP message or the Xn AP message may be a Handover Request message or a RETRIEVE UE CONTEXT RESPONSE. In one example, the first BS receives the first access restriction configuration from the core network in the S1AP message or in the NGAP message. The first access restriction configuration may be an information element of "Forbidden inter Radio Access Technologies (RATs)". The second access restriction configuration may be an information element of "Forbidden inter RATs".

In one example, the first RRC message is generated by the first BS (or the fourth BS of the first RAT) according to the first RAT. The first (or second) RRC message may be a RRC Connection Reconfiguration message. To respond the first (or second) RRC message, the UE may transmit the first (or second) RRC response message (e.g., a RRC Connection Reconfiguration Complete message) to the first BS on the SRB according to the first RAT.

In one example, the first cell is a PCell or a SCell, the second cell is a PCell or a Scell, the third cell is a PCell or a Scell, and the fourth cell is a PCell or a SCell.

The term of "determine" described above may be replaced by "obtain" or "decide". The term of "according to" described above may be replaced by "in response to". The term of "via" described above may be replaced by "on".

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process(es) involving the first BS, the steps performed by the first BS may be compiled into the program codes 214 of the first BS.

To sum up, the present invention provides a method and related communication device for handling a measurement. A BS of a first RAT knows how (when) to configure a UE to measure a second RAT, while communicating with the UE. Thus, the problem of handling the measurement is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a measurement, comprising:
at least one storage device; and
at least one processing circuit, coupled to the at least one storage device, wherein the at least one storage device stores, and the at least one processing circuit is configured to execute instructions of:
connecting to a communication device via a cell belonging to the first BS, and configuring a signaling radio bearer (SRB) to the communication device via the cell;
receiving at least one user equipment (UE) capability of the communication device;
receiving an access restriction configuration for the communication device;
configuring the communication device to measure a second radio access technology (RAT), when the at least one UE capability indicates that the communication device supports a dual connectivity (DC) of a first RAT and the second RAT and the access restriction configuration indicates that the communication device is allowed to use the second RAT; and
not configuring the communication device to measure the second RAT, when the at least one UE capability indicates that the communication device does not support the DC, or when the access restriction configuration indicates that the communication device is not allowed to use the second RAT.

2. The first BS of claim 1, wherein the instruction of configuring the communication device to measure a second radio access technology (RAT) comprises:
transmitting a first radio resource control (RRC) message for configuring the communication device to measure the second RAT to the communication device, wherein the first RRC message comprises a first measurement configuration configuring the communication device to measure the second RAT, and the first measurement configuration configures a first carrier frequency of the second RAT to the communication device, for the communication device to measure the first carrier frequency according to the first measurement configuration.

3. The first BS of claim 2, wherein the instructions further comprise:
performing a secondary node (SN) Addition procedure to configure a second BS of the second RAT as a SN for the communication device according to a first measurement result, wherein the first measurement result is generated by the communication device according to the first measurement configuration.

4. The first BS of claim 1, wherein the instructions further comprise:
configuring the communication device to measure the second RAT for at least one of an Automatic Neighbor Relation (ANR) and a Self-Organizing Networks (SON) Operation.

5. The first BS of claim 1, wherein the first BS receives the at least one UE capability from the communication device, a third BS of the first RAT or a core network, and receives the access restriction configuration for the communication device from the third BS or the core network.

6. A first base station (BS) for handling a measurement, comprising:
at least one storage device; and
at least one processing circuit, coupled to the at least one storage device, wherein the at least one storage device stores, and the at least one processing circuit is configured to execute instructions of:
connecting to a communication device via a cell belonging to the first BS, and configuring a signaling radio bearer (SRB) to the communication device via the cell;
receiving at least one user equipment (UE) capability of the communication device, wherein the at least one UE capability indicates that the communication device supports a dual connectivity (DC) of a first radio access technology (RAT) and a second RAT;
receiving an access restriction configuration for the communication device;
configuring the communication device to measure the second RAT, when the access restriction configuration indicates that the communication device is allowed to use the second RAT; and
not configuring the communication device to measure the second RAT, when the access restriction configuration indicates that the communication device is not allowed to use the second RAT.

7. The first BS of claim 6, wherein the first BS receives the at least one UE capability from the communication device, a third BS of the first RAT or a core network, and receives the access restriction configuration for the communication device from the third BS or the core network.

8. A first base station (BS) for handling a measurement, comprising:
at least one storage device; and
at least one processing circuit, coupled to the at least one storage device, wherein the at least one storage device stores, and the at least one processing circuit is configured to execute instructions of:
connecting to a first communication device via a first cell belonging to the first BS, and configuring a first signaling radio bearer (SRB) to the first communication device via the first cell;
connecting to a second communication device via a second cell belonging to the first BS, and configuring a second SRB to the second communication device via the second cell;
receiving at least one first user equipment (UE) capability of the first communication device and at least one second UE capability of the second communication device, wherein the at least one first UE capability indicates that the first communication device supports a dual connectivity (DC) of a first radio access technology (RAT) and a second RAT, and the at least one second UE capability indicates that the second communication device supports the DC;

receiving a first access restriction configuration for the first communication device and a second access restriction configuration for the second communication device;

configuring the first communication device to measure the second RAT, when the first access restriction configuration indicates that the first communication device is allowed to use the second RAT; and not configuring the second communication device to measure the second RAT, when the second access restriction configuration indicates that the second communication device is not allowed to use the second RAT.

9. The first BS of claim 8, wherein the first BS receives the at least one first UE capability from the first communication device, a second BS of the first RAT or a core network, and receives the at least one second UE capability from the second communication device, the second BS or the core network.

10. The first BS of claim 8, wherein the first BS receives the first access restriction configuration for the first communication device from the second BS or a core network, and receives the second access restriction configuration for the second communication device from the second BS or the core network.

* * * * *